(12) United States Patent
Kim

(10) Patent No.: US 10,556,462 B2
(45) Date of Patent: Feb. 11, 2020

(54) ALUMINUM WHEEL FOR VEHICLE

(71) Applicants: Hyundai Motor Company, Seoul (KR); Kia Motors Corporation, Seoul (KR)

(72) Inventor: Hyun Soo Kim, Whasung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 160 days.

(21) Appl. No.: 15/807,397

(22) Filed: Nov. 8, 2017

(65) Prior Publication Data
US 2018/0345722 A1    Dec. 6, 2018

(30) Foreign Application Priority Data
Jun. 2, 2017    (KR) .................. 10-2017-0069096

(51) Int. Cl.
*B60B 21/12*    (2006.01)
*B60B 25/22*    (2006.01)
*B60B 21/02*    (2006.01)

(52) U.S. Cl.
CPC ............. *B60B 21/12* (2013.01); *B60B 25/22* (2013.01); *B60B 21/023* (2013.01); *B60B 21/026* (2013.01); *B60B 2900/131* (2013.01); *B60B 2900/133* (2013.01)

(58) Field of Classification Search
CPC ... B60B 21/12; B60B 25/22; B60B 2900/133; B60B 2900/131; B60B 21/023; B60B 21/026
USPC ........................................................ 152/381.6
See application file for complete search history.

(56) References Cited

U.S. PATENT DOCUMENTS

| 3,996,985 | A  | * | 12/1976 | Cady ....................... B60B 21/12 |
|           |    |   |         |         152/340.1                       |
| 8,286,679 | B2 | * | 10/2012 | Kamiyama ............... B60B 1/08 |
|           |    |   |         |         152/381.6                       |
| 8,418,735 | B2 | * | 4/2013  | Kamiyama ............... B60B 1/08 |
|           |    |   |         |         152/381.6                       |
| 8,490,665 | B2 | * | 7/2013  | Nagata ..................... B60B 1/06 |
|           |    |   |         |         152/381.6                       |
| 2009/0072611 | A1 | * | 3/2009 | Kashiwai ............ B60C 23/0408 |
|           |    |   |         |         301/5.21                        |
| 2014/0346843 | A1 | * | 11/2014 | Kamiyama ............. B60B 21/12 |
|           |    |   |         |         301/5.1                         |

FOREIGN PATENT DOCUMENTS

| JP | 2008-230408 A  |   | 10/2008 |
| JP | 2008-279873 A  |   | 11/2008 |
| JP | 2015-145181 A  |   | 8/2015  |
| JP | 2015145181 A   | * | 8/2015  |

* cited by examiner

*Primary Examiner* — S. Joseph Morano
*Assistant Examiner* — Jean W Charleston
(74) *Attorney, Agent, or Firm* — Morgan, Lewis & Bockius LLP

(57) ABSTRACT

Disclosed is an aluminum wheel for a vehicle, in which a resonance tube is coupled to a rim of the wheel, wherein a first surface of the resonance tube is fitted into a well groove formed in a well of the rim, and a second surface of the resonance tube comes into contact with the rim by a pressure member including a steel wire and a fixing member.

6 Claims, 3 Drawing Sheets

ALUMINUM WHEEL FOR VEHICLE

CROSS-REFERENCE(S) TO RELATED APPLICATIONS

The present application claims priority to Korean Patent Application No. 10-2017-0069096, filed on Jun. 2, 2017, the entire contents of which is incorporated herein for all purposes by this reference.

BACKGROUND OF THE INVENTION

Field of the Invention

The present invention relates to an aluminum wheel for a vehicle, and, more particularly, to an aluminum wheel for a vehicle in which a resonance tube is coupled to a rim of the wheel.

Description of Related Art

In general, a tire is excited while a vehicle travels due to a road surface, causing a sidewall of the tire to vibrate accordingly. In the present case, resonance occurs in the restricted volume within the tire due to a vibration of the sidewall, and a resonant sound typically occurs in a frequency band of approximately 200 Hz to 300 Hz.

The resonant sound is transmitted to a vehicle body through a chassis of the vehicle, and is finally transmitted to occupants in the internal of the vehicle, causing a reduction in ride quality and in merchantability of the vehicle.

To reduce and dampen generation of the resonant sound being transmitted to the internal of the vehicle, there has been provided a structure in which a resonance tube is coupled to a rim of a wheel, as well as another structure in which a separately manufactured resonance tube is directly welded to a rim of a wheel to couple the resonance tube.

However, direct welding of the resonance tube to the rim of the wheel is disadvantageous wherein durability of the wheel deteriorates due to welding heat.

Alternatively, to prevent the deterioration of the durability of the wheel due to welding heat, there is provided a structure in which a groove is formed in the well of the rim and a ring-shaped vertical wall is formed in the center portion of the rim wherein one surface of the resonance tube is fitted into the groove of the well and the other surface of the resonance tube is fitted to the vertical wall for assembly of the resonance tube.

However, the above structure is disadvantageous in that it costs too much since a special processing device is required to form the vertical wall in the center portion of the rim, causing a reduction in productivity and an increased processing time.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Accordingly, the present invention has been made keeping in mind the above problems occurring in the related art, and various aspects of the present invention are directed to providing an aluminum wheel for a vehicle in which a resonance tube is coupled to a rim and configured to prevent a reduction in durability due to welding heat. The resonance tube is not directly welded to the rim achieving a reduction in cost and an improvement in productivity by coupling the resonance tube in a simple and convenient manner.

Various aspects of the present invention are directed to providing an aluminum wheel for a vehicle in which a resonance tube is coupled to a rim in a circumferential direction of the rim, wherein one surface of the resonance tube is fitted into a well groove formed in a well of the rim, and the other surface of the resonance tube comes into surface-contact with the rim by a pressure member configured to force the second surface of the resonance tube toward the rim.

The pressure member may include a steel wire with which the other surface of the resonance tube is fixedly wound about multiple times in the circumferential direction of the rim, and may include a fixing member configured to fix both end portions of the steel wire, preventing an unwinding of the wound steel wire.

The other surface of the resonance tube may be formed with a concave groove, and the steel wire may be wound about the other surface of the resonance tube wherein the steel wire is inserted into the concave groove.

The resonance tube may include plastic, and the fixing member may be a coagulation generated by welding the other surface of the plastic resonance tube with ultrasonic waves.

The fixing member may be coupled to the resonance tube wherein the fixing member fills the concave groove.

Both end portions of the steel wire may be wound wherein the steel wire has an overlap portion having a predetermined length, and the fixing member may be coupled to the resonance tube wherein the fixing member fills the concave groove while covering the steel wire including the overlap section.

As apparent from the above description, in an exemplary embodiment of the present invention, one surface of the resonance tube is fitted into the well groove formed in the well of the rim and the other surface of the resonance tube comes into tight contact with the rim by the pressure member which includes the steel wire and the fixing member. Through such a structure, it is possible to prevent damage due to welding heat since the welding is not performed to couple the resonance tube. Therefore, it is possible to significantly improve the durability of the aluminum wheel, and furthermore, reduce processing and manufacturing costs.

In addition, the present invention has a structure in which the other surface of the resonance tube comes into tight contact with the rim by the pressure member including the steel wire and the fixing member. Through such a structure, since there is no need to form a vertical wall in the center portion of the rim to couple the other surface of the resonance tube and it is possible to a weight and cost while improving productivity. Furthermore, it is possible to manufacture the aluminum wheel by an automatous process using a flow forming method and to thus secure a quality of the aluminum wheel. In addition, the aluminum wheel is light and is manufactured at a low cost as compared to a wheel manufactured by a casting method.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
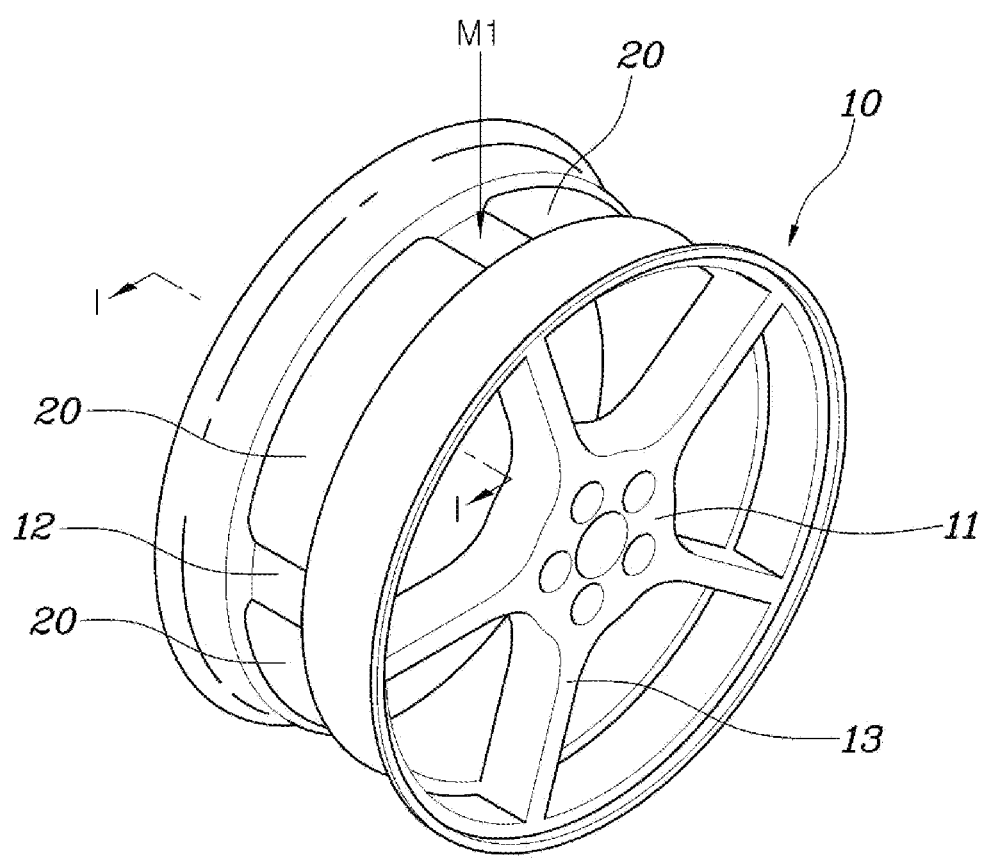
FIG. 1 is a perspective view illustrating an aluminum wheel for a vehicle to which a resonance tube is coupled according to an exemplary embodiment of the present invention.
Figure 2:
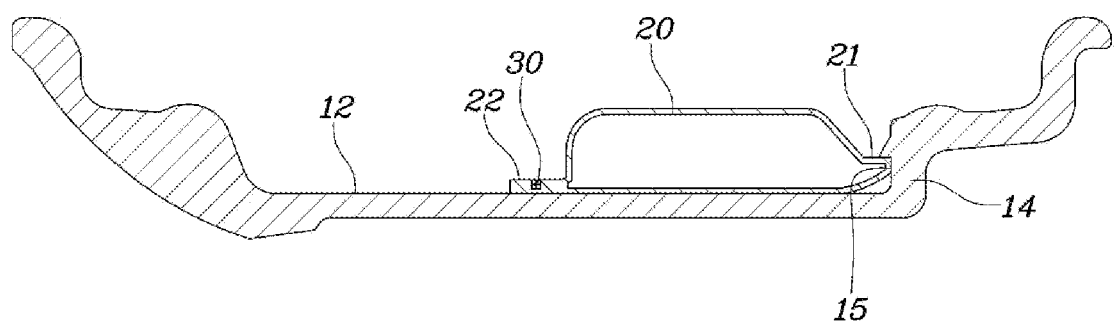
FIG. 2 is a cross-sectional view taken along line I-I of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalents parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As illustrated in FIG. 1, FIG. 2, FIG. 3, FIG. 4, and FIG. 5, an aluminum wheel 10 for a vehicle according to an exemplary embodiment of the present invention includes a center hub 11, a rim 12 that circumferentially forms an external flange of the wheel 10 while a tire is coupled to the rim 12, and a plurality of spokes 13 connecting the hub 11 to the rim 12.

The hub 11 may be formed integrally or monolithically in the center portion of the spokes 13 as the spokes 13 are manufactured.

The aluminum wheel 10, according to an exemplary embodiment of the present invention, has a structure in which a plurality of resonance tubes 20 are coupled to the rim 12 in a circumferential direction of the rim and configured to reduce a resonant sound transmitted to an internal of the vehicle.

The wheel 10, according to an exemplary embodiment of the present invention, may include aluminum and the resonance tubes 20 may separately include plastic.

The resonance tubes 20 are circumferentially coupled to an external peripheral surface of the rim 12. Both end portions of each of the resonance tubes 20 are coupled to extend along the circumferential direction of the aluminum wheel 10, and a first surface 21 and a second surface 22 of the resonance tube 20 are respectively coupled to be directed toward both sides of the aluminum wheel 10.

To couple the resonance tube 20, a well groove 15 is formed in a well 14 of the rim 12 and one surface 21 of the resonance tube 20 is fitted into the well groove 15.

The other surface 22 of the resonance tube 20 comes into surface-contact with the rim 12 by a pressure member 30 that forces the second surface 22 toward the rim.

That is, the pressure member 30 includes a steel wire 31 with which the second surface 22 of the resonance tube 20 is fixedly wound about multiple times in the circumferential direction of the rim 12, and a fixing member 32 configured to fix both end portions of the wound steel wire 31 preventing the unwinding of the steel wire 31.

The other surface 22 of the resonance tube 20 is formed with a concave groove 23 of a predetermined-size, configured for coupling the steel wire 31 therein. The steel wire 31 is wound about the other surface 22 of the resonance tube 20 wherein the steel wire 31 is inserted into the concave groove 23.

The fixing member 32 may be a coagulation generated by welding the other surface 22 of the plastic resonance tube 20 using ultrasonic waves.

That is, when an ultrasonic welding machine applies ultrasonic waves to an opening portion of the concave groove 23 after the steel wire 31 is wound about the rim 12, wherein the steel wire 31 is inserted into the concave groove 23, the opening portion of the concave groove 23 is melted and fused by heat, and the molten material coagulates while filling the concave groove 23. Thus, the steel wire 31 wound into the concave groove 23 may be maintained in a state in which it is securely coupled by the fixing member 32.

Since the steel wire 31 is wound wherein it is inserted into the concave groove 23, it is possible to prevent exposure of the steel wire 31 to an external of the resonance tube 20, and it is further possible to improve a coupling force of the steel wire 31 using the fixing member 32.

Meanwhile, one end portion 31a and the other end portion 31b of the steel wire 31 are wound wherein the steel wire 31 has an overlap portion S1 having a predetermined length. The fixing member 32 is coupled to the resonance tube 20 wherein the fixing member 32 fills the concave groove 23, and preferably covers the steel wire 31 including the overlap portion S1.

The reason that one end portion 31a and the other end portion 31b of the steel wire 31 are wound in an overlap manner to is configured to maintain a more robust coupling force when the steel wire is coupled using the fixing member 32.

Figure 3:
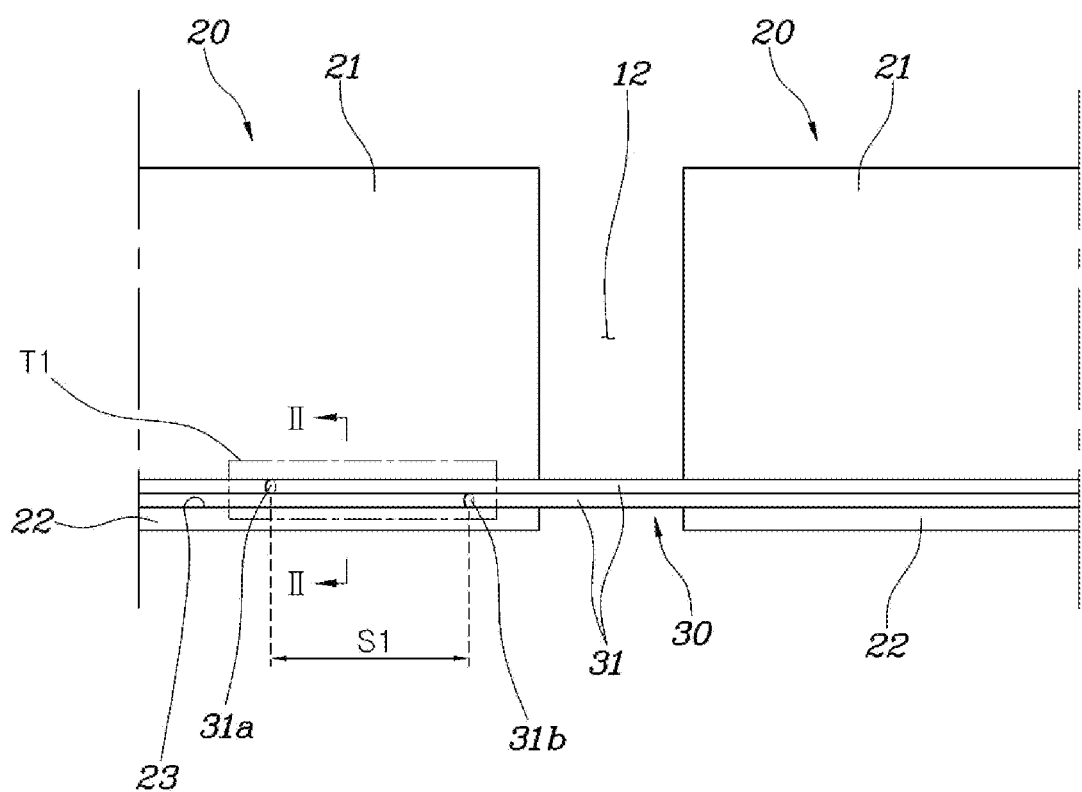
FIG. 3 is a top view taken from arrow M1 of FIG. 1.
Figure 4:
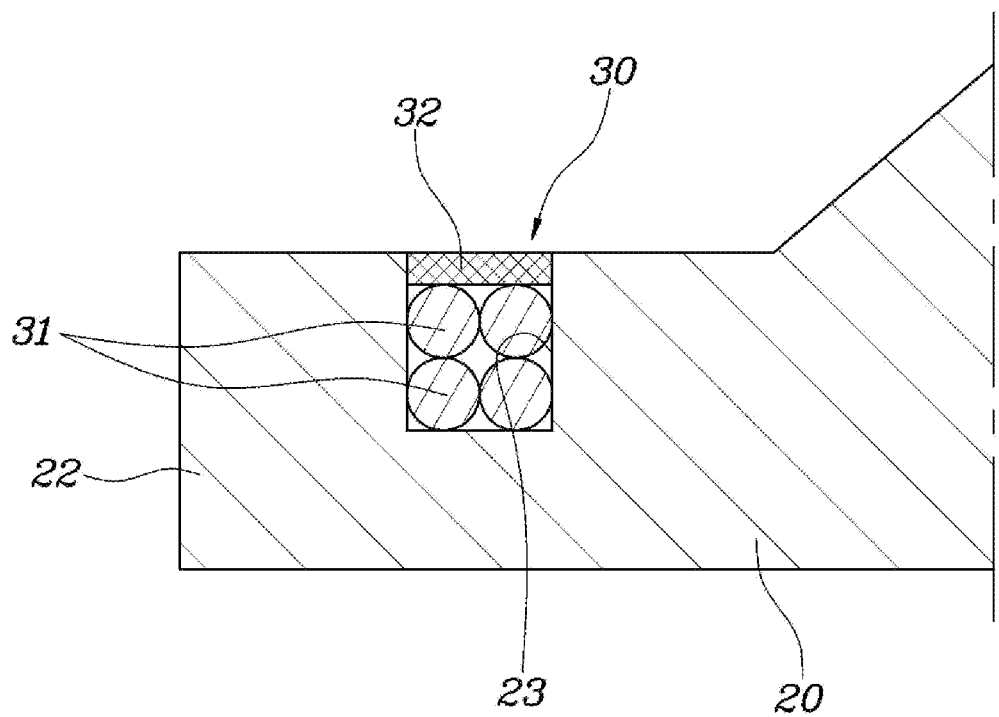
FIG. 4 is a cross-sectional view taken along line II-II of FIG. 3.
Figure 5:
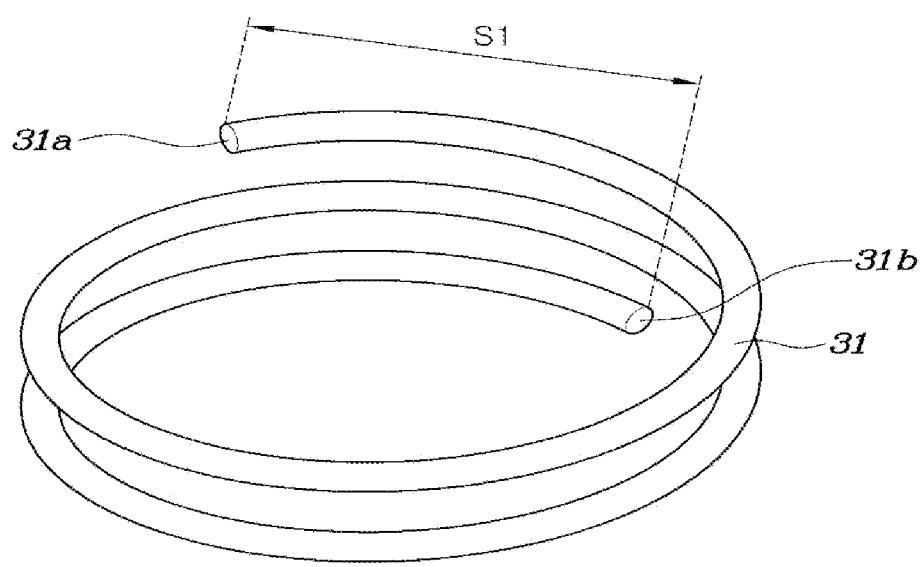
FIG. 5 is a perspective view illustrating a steel wire according to the exemplary embodiment of the present invention.

Reference numeral T1 in FIG. 3 refers to a section, or area, in which the fixing member 32 is coupled by ultrasonic welding.

As described above, in the exemplary embodiment of the present invention, one surface 21 of the resonance tube 20 is fitted into the well groove 15 formed in the well 14 of the rim 12 and the other surface 22 of the resonance tube 20 comes into tight contact with the rim 12 by the pressure member 30 including the steel wire 31 and the fixing member 32. Through such a structure, it is possible to prevent damage due to welding heat, since welding is not performed, to couple the resonance tube as in the related art. Therefore, it is possible to significantly improve the durability of the aluminum wheel, and furthermore, reduce costs related to processing and manufacturing.

In addition, the present invention has a structure in which the other surface 22 of the resonance tube 20 comes into tight contact with the rim 12 by the pressure member 30 including the steel wire 31 and the fixing member 32. Through such a structure, since there is no need to form the vertical wall in the center portion of the rim to couple the other surface of the resonance tube, as in the related art, and it is possible to achieve a reduction in weight and cost while improving productivity.

That is, when the vertical wall is formed in the center portion of the rim to couple the other surface of the resonance tube, as in the related art, the aluminum wheel may be manufactured by a casting method. For the present reason, the aluminum wheel is heavy, is costly too much to manufacture, and the productivity of the aluminum wheel is reduced. It is difficult to ensure the quality of the aluminum wheel since it is impossible to manufacture the aluminum wheel by an autonomous process.

However, the vertical wall is not formed in the center portion of the rim 12 to couple the other surface 22 of the resonance tube 20 in an exemplary embodiment of the present invention. Therefore, it is possible to manufacture the aluminum wheel 10 by an automatous process using a flow forming method and to ensure the quality of the aluminum wheel when manufactured. In addition, the aluminum wheel 10 is light, is manufactured at a low cost, and it is possible to significantly improve the productivity of the aluminum wheel as compared to a wheel manufactured by a casting method.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An aluminum wheel for a vehicle, in which a resonance tube is coupled to a rim in a circumferential direction of the rim, wherein
   a first surface of the resonance tube is fitted into a well groove formed in a well of the rim; and
   a second surface of the resonance tube comes into contact with the rim by a pressure member configured to force the second surface of the resonance tube toward the rim,
   wherein, the pressure member includes a steel wire with which the second surface of the resonance tube is fixedly wound a plurality of times in the circumferential direction of the rim.

2. The aluminum wheel according to claim 1, wherein the pressure member further includes:
   a fixing member configured to fix first and second end portions of the steel wire to prevent unwinding of the wound steel wire.

3. The aluminum wheel according to claim 2, wherein
   the second surface of the resonance tube is formed with a concave groove; and
   the steel wire is wound about the second surface of the resonance tube, the steel wire inserted into the concave groove.

4. The aluminum wheel according to claim 3, wherein
   the resonance tube includes a plastic; and
   the fixing member is a coagulation generated by welding the second surface of the plastic resonance tube with ultrasonic waves.

5. The aluminum wheel according to claim 4, wherein the fixing member is coupled to the resonance tube and the fixing member fills the concave groove.

6. The aluminum wheel according to claim 4, wherein
   the first and second end portions of the steel wire are wound and the steel wire has an overlap portion having a predetermined length; and
   the fixing member is coupled to the resonance tube and the fixing member fills the concave groove while covering the steel wire including the overlap portion.

* * * * *